(12) United States Patent
Probst et al.

(10) Patent No.: US 7,996,440 B2
(45) Date of Patent: Aug. 9, 2011

(54) EXTRACTION OF ATTRIBUTES AND VALUES FROM NATURAL LANGUAGE DOCUMENTS

(75) Inventors: Katharina Probst, Chicago, IL (US); Rayid Ghani, Chicago, IL (US); Andrew E. Fano, Lincolnshire, IL (US); Marko Krema, Evanston, IL (US); Yan Liu, New York City, NY (US)

(73) Assignee: Accenture Global Services Limited, Dublin (IE)

( * ) Notice: Subject to any disclaimer, the term of this patent is extended or adjusted under 35 U.S.C. 154(b) by 483 days.

(21) Appl. No.: 11/742,215

(22) Filed: Apr. 30, 2007

(65) Prior Publication Data

US 2007/0282892 A1 Dec. 6, 2007

Related U.S. Application Data

(60) Provisional application No. 60/803,940, filed on Jun. 5, 2006.

(51) Int. Cl.
*G06F 17/30* (2006.01)
(52) U.S. Cl. ........................... 707/803; 704/275
(58) Field of Classification Search .................. None
See application file for complete search history.

(56) References Cited

U.S. PATENT DOCUMENTS

| | | | |
|---|---|---|---|
| 5,146,406 A | 9/1992 | Jensen | |
| 5,943,670 A | 8/1999 | Prager | |
| 6,405,175 B1 | 6/2002 | Ng | |
| 6,668,254 B2 | 12/2003 | Matson | |
| 6,714,939 B2 | 3/2004 | Saldanha | |
| 6,785,671 B1 | 8/2004 | Bailey | |
| 6,986,104 B2 | 1/2006 | Green et al. | |
| 7,020,662 B2 | 3/2006 | Boreham et al. | |
| 7,043,420 B2 | 5/2006 | Ratnaparkhi | |
| 7,043,492 B1 | 5/2006 | Neal et al. | |
| 7,567,976 B1 | 7/2009 | Betz et al. | |
| 2002/0107861 A1* | 8/2002 | Clendinning et al. | 707/101 |
| 2002/0111863 A1 | 8/2002 | Landesman | |
| 2002/0133479 A1 | 9/2002 | Dippold | |
| 2002/0142277 A1 | 10/2002 | Burstein et al. | |

OTHER PUBLICATIONS

Ester, (A Density-Based Algorithm for Discovering Clusters in Large Spatial Databases with Noise, AAI, 1996, pp. 226-231).*
Naumann (Declarative Data Mining with Conflict Resolution, IBM, 2002, pp. 1-13).*

(Continued)

*Primary Examiner* — Robert Timblin
*Assistant Examiner* — Noosha Arjomandi
(74) *Attorney, Agent, or Firm* — Vedder Price PC

(57) ABSTRACT

One or more classification algorithms are applied to at least one natural language document in order to extract both attributes and values of a given product. Supervised classification algorithms, semi-supervised classification algorithms, unsupervised classification algorithms or combinations of such classification algorithms may be employed for this purpose. The at least one natural language document may be obtained via a public communication network. Two or more attributes (or two or more values) thus identified may be merged to form one or more attribute phrases or value phrases. Once attributes and values have been extracted in this manner, association or linking operations may be performed to establish attribute-value pairs that are descriptive of the product. In a presently preferred embodiment, an (unsupervised) algorithm is used to generate seed attributes and values which can then support a supervised or semi-supervised classification algorithm.

34 Claims, 7 Drawing Sheets

OTHER PUBLICATIONS

Ghani (Mining the Web to Add Semantics to Retail Data Mining, Springer, 2004, pp. 43-56).*
Guha, (A Clustering Algorithm for Categorical Attributes, Elsevier, 2000, pp. 1-24).*
Collins (Unsupervised Models for Named Entity Classification, 1999, pp. 100-110).*
Songfeng (Unsupervised Clustering Based Reduced Support Vector Machines, IEE, 2003, pp. 821-824).*
A.P. Dempster et al., "Maximum Likelihood from Incomplete Data via the EM Algorithm", Journal of the Royal Statistical Society, Series B, 39 (1):1-38, 1977.
R. Agrawal, et al., "Fast Discovery of Association Rules", in U. Fayyad et al, editors, Advances in Knowledge Discovery and Data Mining, AAAI Press/The MIT Press, pp. 307-328, 1996.
T. Jaakkolda et al., "Exploiting generative models in discriminative classifiers", In Advances in NIPS 11, 1999.
D.D. Lewis, "Naive (Bayes) at Forty: The Independence Assumption in Information Retrieval", in Machine Learning: ECML-98, Tenth European Conference on Machine Learning, pp. 4-15, 1998.
K. Seymour, et al., "Learning Hidden Markov Model Structure for Information Extraction", in Machine Learning for Information Extraction Papers from the AAAI Workshop, 1999. Tech Rep. WS-99-11, AAAI Press.
U.Y. Nahm, et al., "Text Mining with Information Extraction", in AAAI 2002 Spring Symposium on Mining Answers from Texts and Knowledge Bases, 2002.
A. McCallum & K. Nigam, A Comparison of Event Models for Naive Bayes Text Classification, in Learning for Text Categorization: Papers from the AAAI Workshop, pp. 41-48, 1998. Tech. Rep. WS-98-05, AAAI Press.
R. Ghani et al, Data Mining on Symbolic Knowledge Extraction from the Web, in Workshop of Text Mining at the Sixth ACM SIGKDD International Conference on Knowledge Discovery and Data Mining, 2000.
T. Joachims, "Transductive Inference for Text Classification Using Support Vector Machines." In Machine Learning; Proceedings of the Sixteenth International Conference, 1999.
M. Craven, et al., "Learning to Construct Knowledge Bases from the World Wide Web", Artificial Intelligence, 118 (1-2):69-114, 2000.
A. Blum & T. Mitchell, "Combining Labeled and Unlabeled Data with Co-Training", Proceedings of the 1998 Conference on Computational Learning Theory.
E. Brill, "Transformation-Based Error-Driven Learning and Natural Language Processing: A Case Study in the Part-of-Speech Tagging", Association for Computational Linguistics, 1995.
M. Collins & Y. Singer, "Unsupervised Models for Named Entity Classification", AT&T Labs—Research.
J. Ben Schafer, et al., "E-Commerce Recommendation Applications", GroupLens Research Project, Department of Computer Science and Engineering, University of Minnesota.
R. Ghani & A. Fano, "Building Recommender Systems using a Knowledge Base of Product Semantics", Accenture Technology Labs, Chicago, Illinois.
R. Ghani & R. Jones, "A Comparison of Efficacy and Assumptions of Bootstrapping Algorithms for Training Information Extraction Systems", Accenture Technology Labs, Chicago IL, School of Computer Science, Carnegie Mellow University, Pittsburgh PA.
D. Lin, "Dependency-Based Evaluation of Minipar", Department of Computer Science, University of Alberta, Edmonton, Alberta, Canada.
R. Jones, "Learning to Extract Entities from Labeled and Unlabeled Text," School of Computer Science, Carnegie Mellon University, May 2005.
B. Liu, et al., "Opinion Observer: Analyzing and Comparing Opinions on the Web", International World Wide Web Conference Committee (IW3C2), WWW2005, May 10-14, 2005, Chiba, Japan.
K. Nigam & R. Ghani, "Analyzing the Effectiveness and Applicability of Co-Training", School of Computer Science, Carnegie Mellon University, Pittsburgh, PA.

F. Peng, A. McCallum, "Accurate Information Extraction from Research Papers using Conditional Random Fields", Department of Computer Science, University of Massachusetts, Amherst MA.
A.M. Popescu & O. Etzioni, "Extracting Product Features and Opinions from Reviews", Department of Computer Science and Engineering, University of Washington, Seattle, WA.
M.F. Porter, "An Algorithm for Suffix Stripping", PROGRAM, 14 No. 3, pp. 130-137, Jul. 1980.
"Text Classification from Labeled and Unlabeled Documents using EM", Nigam, et al., Machine Learning 1-34, Kluwer Academic Publishers, Boston, Manufactured in the Netherlands.
Hoiem, et al., "Object-Based Image Retrieval Using the Statistical Structure of Images", IEEE Conference on Computer Vision and Pattern Recognition, pp. 1-8, 2004.
DeCoste, et al., "Distortion-Invariant Recognition via Jittered Queries", IEEE, pp. 1-6, 2002.
Zhou, Y., "Democratic Co-Learning", 16th IEEE Conference on Tools with Artificial Intelligence, pp. 1-9, 2004.
Zufiria, et al, "Extended Backpropagation for Invariant Pattern Recognition Neural Networks", International Joint Conference on Neural Networks, pp. 2097-2100, 1993.
Licsar, et al., "User-Adaptive Hand Gesture Recognition System with Interactive Training", Image and Vision Computing 23, pp. 1102-1114, 2005.
Becker, D., "Sensei: A Real-Time Recognition, Feedback and Training System for T'ai Chi Gestures", MIT Media Lab Perceptual Computing Gruop Technical Report No. 426, pp. 1-50, 1997.
Probst, K., R. Ghani, "Towards 'Interactive' Active Learning in Multi-view feature sets for Information Extraction", Lecture Notes in Computer Science, vol. 4701, Sep. 8, 2007, pp. 683-690, XP019071429.
Probst, et al., "Semi-Supervised Learning of Attribute Value Pairs from Product Descriptions" Proceedings of the 20th International Joint Conferences on Artificial Intelligence (IJCAI '07) Jan. 6, 2007-Jan. 12, 2007, pp. 2838-2843, XP007906331.
Probst, et al., "Semi-Supervised Learning to Extract Attribute-Value Pairs from Product Descriptions on the Web", Proceedings of the 2006 Workshop on Web Mining (Webmine '06); 17th European Conference on Machine Learning (ECML '06) & 10th European Conference on Priciples and Practice of Knowledge Discovery in Databases (PKDD '06) Sep. 18, 2006, pp. 38-49, XP002504179.
International Search Report and Written Opinion for PCT/GB2008/003188 dated Sep. 12, 2008, Form PCT/ISA/210.
International Preliminary Report on Patenability under Cahpter I for PCT/GB2008/003118 dated Mar. 25, 2010.
Jones, et al., "Active Learning for Information Extraction with Multiple View Feature Sets", ECML 2003 Workshop on Adaptive Text Extraction and Mining, 2003.
Lewis, David and William Gale, "A Sequential Algorithm for Training Test Classifiers", 1994, Proceedings of Seventeenth Annual International ACM-SIGIR Conference on research and Development in Information Retrieval, Springer-Verlag, London, pp. 3-12.
Lin, Dekang, "Dependency-Based Evaluation of Minipar", Workshop on the Evaluation of Parsing Systems, 1998.
McCallum, Andrew and Kamal Nigan, "Employing EM and Pool-Based Active Learning for Text Classification", Proceedings of ICML, 1998.
Muslean, Ion, et al, "Active+ Semi-Supervised Learning = Robust Multi-View Learning", Proceedings of the ICML, 2002.
Thompson, Cynthia et al., "Active Learning for Natural Language Parsing and Information Extraction", ICML, 1999.
Tong, Simon and Daphne Koller, "Support Vector Machine Active Learning with Applications to Text Classification", Journal of Machine Learning Research, 2001.
Finn, Aidan and Nicholas Kushmerick, "Active Learning Selection Strategies for Information Extraction", ECML-03 Workshop on Adaptive Text Extraction and Mining 2003.
Agrawal, et al., "On Integrating Catalogs", ACM, May 2001.
Joachims, "A Probabilistic Analysis of the Rocchio Algorithm with TFIDF for Text Categorization", Carnegie Mellon University, Mar. 1996.

* cited by examiner

| This shoe has | leather | soles. |
|---|---|---|
| | *value* __1008__ | |

| This shoe has | leather | soles. |
|---|---|---|
| *value context* __1102__ | *value* __1008__ | *value context* __1104__ |

| This shoe has | synthetic | soles. |
|---|---|---|
| *value context* __1208__ | *value* __1212__ | *value context* __1210__ |

| This shoe has | synthetic | soles. |
|---|---|---|
| This shoe has | trail-running 1304 | soles. |
| value context 1308 | value 1312 | value context 1310 |

| Running shirt made of | synthetic | material. |
|---|---|---|
| Running shirt made of | lightweight 1416 | material. |
| value context 1410 | value 1408 | value context 1412 |

| Running shirt made of | lightweight | material. |
|---|---|---|
| likely attribute 1502 | value 1408 | likely attribute 1504 |

| Running shirt made of | lightweight | material. |
|---|---|---|
|  | Synthetic 1602 | material. |
| possible attribute 1608 | value 1408 | attribute 1606 |

EXTRACTION OF ATTRIBUTES AND VALUES FROM NATURAL LANGUAGE DOCUMENTS

CROSS-REFERENCE TO RELATED APPLICATIONS

The instant application claims the benefit of Provisional U.S. Patent Application Ser. No. 60/803,940 entitled "Text Mining For Product Attribute Extraction" and filed Jun. 5, 2006, the entirety of which is incorporated herein by this reference. The instant application is also related to application Ser. No. 11/742,244, filed on even date herewith.

FIELD OF THE INVENTION

The present invention relates generally to determination of product attributes and values and, in particular, to techniques for extracting such attributes and values from natural language documents.

BACKGROUND OF THE INVENTION

Retailers have been collecting a growing amount of data from various sources in hopes of improving business performance based on analysis of such data. For example, most retailers have terabytes of transaction data containing customer information and related transactions. These data warehouses also contain product information, but that information is often very sparse and limited. For example, most retailers treat products as "atomic" entities with very few related attributes (typically brand, size, or color). Nevertheless, retailers currently try to use transactional data for various applications, such as demand forecasting, assortment optimization, product recommendations, assortment comparison across retailers/manufacturers or product supplier selection. However, treating products as atomic entities hinders the effectiveness of these applications. Representations of products in terms of attributes and attribute values would significantly improve, both in terms of efficiency and efficacy, the above-mentioned applications. As used hereinafter, attributes describe a generalized quality, property, or characteristic of a product, whereas values assign a specific quantity, quality, configuration, etc. to an otherwise generic attribute.

For example, assume a grocery store wants to forecast sales of "Tropicana Low Pulp Vitamin-D Fortified Orange Juice 1-liter plastic bottle". Typically, they would look at sales of the same product from the same time last year and adjust that number based on some new information. If this particular product is new, however, data from previous years will obviously not be available. In contrast, representing the product as a set of attribute-value pairs (e.g., Brand: Tropicana; Pulp: Low; Fortified with: Vitamin-D; Size: 1 liter; Bottle Type: Plastic) would enable use of data from other products having identical or similar attributes, thereby enabling a more accurate forecast. Even if the product is not new, representing it in terms of attribute-value pairs allows comparison with other related products and improved forecasts.

Many retailers have realized this recently and are trying to enrich their product databases with attributes and corresponding values for each product. However, this is typically done using a manual process in which product descriptions (often obtained from an internal database, the World Wide Web or actual product packaging) are individually inspected, making the process relatively inefficient and expensive. Automation of this type of processing would greatly improve efficiency and overall expense.

To this end, techniques for extracting information from text documents are well known. However, such techniques have not been applied to the problem of extracting product attributes and values. For example, recently proposed techniques extract product features and their polarity (i.e., "good", "bad", "useful", etc.) from online user reviews. While these techniques attempt to describe a product as a vector of attributes, they do not address the extraction of values or associating the extracted attributes and values together. Other techniques encompass information extraction with the goal of filling templates whereby certain parts of a text document are extracted as relevant facts. However, these techniques start with a definitive list of template slots, akin to attributes, rather than deriving such attributes directly from the documents themselves. Additional work has been performed in the area of extracting named entities from documents using so-called semi-supervised learning, discussed in further detail below. However, while these techniques essentially perform classification of words/phrases as attributes or values, such classifications are performed independently of each other, and attribute-value pairs are not determined. Further still, such classification techniques have not been applied to the determination of product attributes and values. Recently, Silver Creek Systems, Inc. has offered its "DATALENS" system as means for developing "understanding" of, for example, a company's products through analysis of product descriptions. Relying on user intervention to identify attributes and values manually, at least in part, the "DATALENS" system uses non-classification-based techniques (i.e., the development of schemas in which core terms are further described by their attributes and values) to transform such product descriptions from one or more (often idiosyncratic) language domains into other, more useful language domains.

Thus, it would be advantageous to provide techniques that allow for the establishment of product attribute-value pairs through the automatic extraction of product attributes and values while overcoming the limitations of prior art techniques.

SUMMARY OF THE INVENTION

The present invention provides techniques for extracting product attributes and corresponding values in an automated fashion. In particular, the present invention teaches the application of classification algorithms to natural language documents in order to extract both attributes of a given product as well as corresponding values of the attributes. Supervised classification algorithms, semi-supervised classification algorithms, unsupervised classification algorithms or combinations of such classification algorithms may be employed for this purpose. In one embodiment, of the present invention, the one or more natural language documents operated upon by the classification algorithm are obtained via a public communication network, such as the World Wide Web. Two or more attributes (or two or more values) thus identified may be merged to form one or more attribute phrases or value phrases. Furthermore, once attributes and values have been extracted in this manner, association or linking operations may be performed to establish attribute-value pairs that are descriptive of the product.

In a presently preferred embodiment, a seed algorithm (unsupervised) is used to generate seed attributes and corresponding seed values based on at least one natural language document. Thereafter, a classification algorithm employs the seed attributes and seed values to further identify (i.e., "extract") additional attributes and values from the at least one natural language document. The classification algorithm used for this purpose comprises a combination of a supervised classification algorithm operating in conjunction with a semi-supervised algorithm, thereby obtaining the benefits of each type of classification algorithm. In this manner, the present invention provides techniques that are readily implemented in an automated fashion, thereby greatly improving the determination of product attributes and values and, consequently, product attribute-value pairs.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only; with reference to the accompanied drawings wherein like reference numerals represent like elements and in which:

FIG. 8 is a block diagram of a preferred implementation of a classification module in accordance with the present invention;

FIGS. 10-16 illustrate operation of a semi-supervised algorithm in accordance with an embodiment of the present invention.

DETAILED DESCRIPTION OF THE PRESENT EMBODIMENTS

Figure 1:
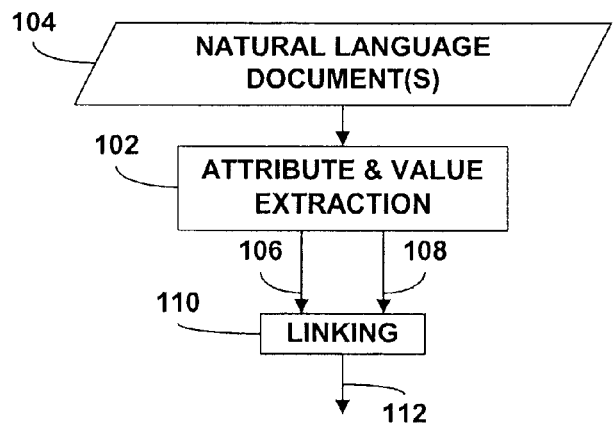
FIG. 1 is a block diagram schematically illustrating high-level processing in accordance with an embodiment of the present invention.

Referring now to FIG. 1, high-level processing in accordance with an embodiment of the present invention is illustrated in block diagram form. In particular, one or more natural language documents 104, descriptive of one or more products, are provided as input to an attribute and value extraction process 102. Using techniques describe in further detail below, the attribute and value extraction process 102 provides at least one attribute 106 and at least one value 108 to a linking process 110, which operates to identify attribute-value pairs. In a presently preferred embodiment, the processing of the various embodiments of the present invention, as exemplified in FIG. 1, is carried out using one or more suitably programmed computers or equivalents thereof.

The at least one natural language document 104 preferably describes one or more products. As used herein, a natural language document comprises any document that at least textually describes a product using virtually any language syntax normally used by, and intended for consumption by, humans, either orally or in written form, when describing something. As such, a natural language document may be expressed in any language. In a most general sense, a product may comprise anything that may be described using a natural language document and, in a presently preferred embodiment, comprises any object or service that is made available by a supplying entity (e.g., retailers, manufacturers, etc.) for use by interested consumers. For instance, it is anticipated that the present invention may be beneficially applied to retailers or other commercial enterprises that offer an array of merchandise and/or services for sale. However, the present invention need not be limited to commercial contexts and may be beneficially applied to any domain where it would be beneficial to gain insight into things described in natural language documents.

As an example, products falling within the general category of sporting, goods is an interesting and relatively challenging domain because unlike electronics, the attributes are not easy and straightforward to detect. For example, a camera has a relatively well-defined list of attributes (resolution, zoom, memory-type, etc.). In contrast, a baseball bat would have some typical attributes such as brand, length, material as well as others that might be harder to identify as attributes and values (aerodynamic construction, curved hitting surface, etc.).

The attribute and value extraction process 102 treats the problem of extracting (identifying) attributes and values as a classification problem and, therefore, employs one or more classification algorithms for this purpose. As known in the art, classification algorithms are applied to documents in an attempt to classify individual words within a document into one of several predefined classes. In the case of the present invention, these classes are defined as "attribute", "value" or "neither" (in addition to a default class of "unassigned"). Words that have been classified in this manner can be thought of as "labeled" data. It should be noted that labeled data may come in the form of individually labeled words or phrases that exist outside the confines of a document structure, e.g., seed attributes and corresponding seed values, as described in greater detail below. In contrast, a document comprises unlabeled data if not all of its constituent words have previously been classified. As described in greater detail below, classification algorithms may be characterized into three different categories: unsupervised, supervised and semi-supervised. The present invention may employ any of these different categories of classification algorithms individually or, as in a presently preferred embodiment, in combination. As known in the art, unsupervised classification algorithms do not require any labeled data as input in order to work, whereas supervised classification algorithms require labeled data in order to train the classifier. Semi-supervised classification algorithms can incorporate both labeled training data and unlabeled data.

Regardless of the particular classification algorithm employed, the attribute and value extraction process 102 provides at least one-attribute 106 and at least one value 108 as output, which are subsequently provided to an association or linking process 110. The linking process 110 formulates one or more attribute-value pairs 112 based on the at least one attribute 106 and at least one value 108. In practice, the classification algorithm employed by the attribute and value extraction process 102 attempts to assign (in a probabilistic sense) a label to all unlabeled words in the natural language documents provided to it. However, it remains to use these labels to tag attributes and values in the actual product descriptions, i.e., in the at least one natural language document originally provided, and to find correspondences between words or phrases tagged as attributes and values. Stated another way, the classification phase assigns a probability distribution over all the labels to each word (or phrase). This is not enough, because some words that are tagged with the same label should be merged to form an, attribute or a value. Additionally, the system must establish links between attributes (or attribute phrases) and their corresponding values (or value phrases), so as to form attribute-value pairs. Some unlabeled data items contain more than one attribute-value pair, so that it is important to find the correct associations between them. As described in greater detail below, the task of associating attributes and values may employ various techniques to establish attribute-value, pairs.

Figure 2:
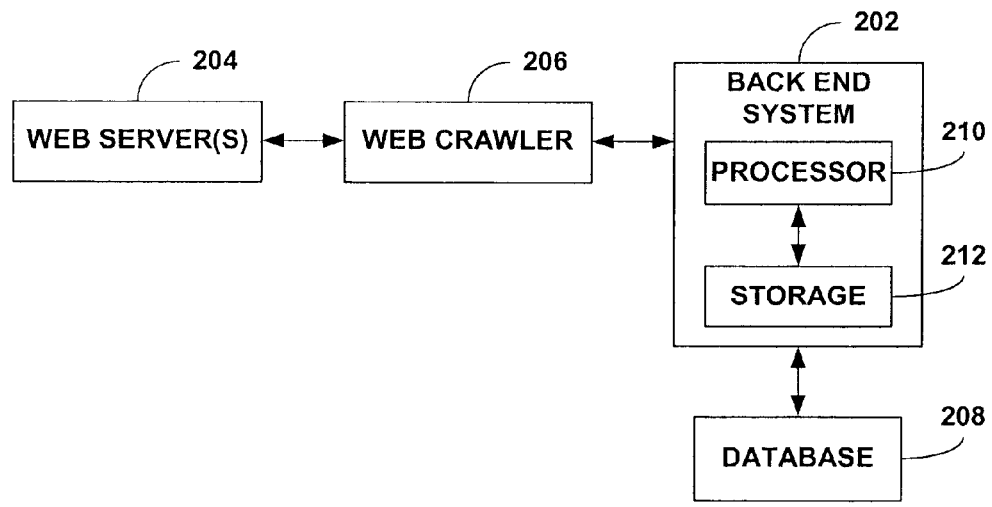
FIG. 2 is a block diagram illustrating a system that may be used in conjunction with an embodiment of the present invention.

Referring now to FIG. 2, a system that may be used to implement one or more of the various embodiments of the present invention is further illustrated. In particular, a back end system 202 is coupled to a database 208. As shown, the back end system 202 comprises at least one processor (such as a microprocessor, microcontroller, digital signal processor, etc. or combinations thereof) coupled to a storage device 212 (such as random-access memory, read-only memory; optical and/or magnetic storage devices, etc.) having stored thereon executable instructions that may be executed by the at least one processor. Generally, the back end system 206 comprises one or more general purpose computers suitably programmed to perform the techniques described herein. As known by those having ordinary skill in the art, however, such processing devices may incorporate, or be replaced by, specialized processing circuits such as programmable logic arrays, application-specific integrated circuits, etc. as a matter of design choice. Although not show, the back end system 202 may comprise a display and other user input/output devices, as known in the art, that allow a user of the back end system 202 to interact with and otherwise control processing in accordance with the present invention.

In a presently preferred embodiment, the natural language documents describing products are available via a public communications network such as the World Wide Web in the form of textual content in web pages. Such content typically resides on one or more web servers 204 coupled to the back end 202 using conventional techniques. Web servers are well known to those having skill in the art. When gathering the documents, a so-called web crawler 206 (i.e., a computer-executed program that visits remote sites and automatically downloads their contents) programmed to visit websites of relevant entities (e.g., retailers, manufacturers, etc.) and extract names, Uniform Resource Locators, descriptions, prices and categories of all products available, may be used. Such a web crawler is preferably implemented using computer-programming techniques and may be programmed to automatically extract information or, in a simpler implementation, manually configured to extract specific information. As the web crawler collects suitable information (descriptions), they are stored in the database 208, which may comprise a suitably configured server computer. Of course, sources of documents other than web sites, such as internal databases or other non-publicly accessible sources may be equally employed. Further, it is not a requirement of the present invention that natural language documents be collected in this manner. For example, pre-compiled databases of such documents may be equally employed.

Figure 3:
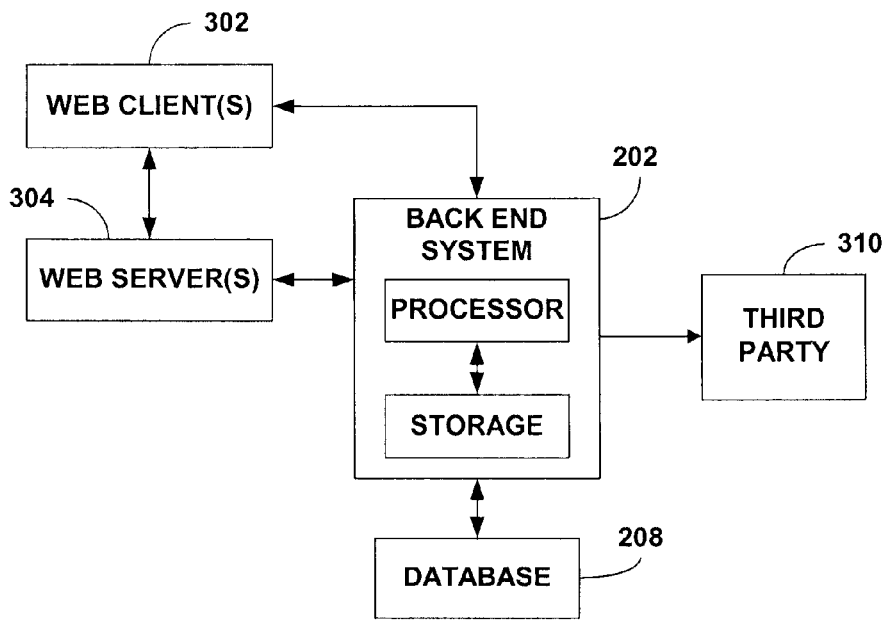
FIG. 3 is a block diagram illustrating an alternative system that may be used in conjunction with another embodiment of the present invention.

Referring now to FIG. 3, another system is shown in which the back end system 202 and database 208 are used to analyze selected/offered products. In particular, the back end system is coupled, preferably via a public communications network such as the World Wide Web, to a web client 302 and/or one or more web servers 304. Once again, web clients are well known to those having ordinary skill in the art. In general, the descriptions of the products to be analyzed (e.g., as shown in FIG. 1 and as described in detail below) may be identified from either or both of two sources: products that are selected by an entity or products that are offered by an entity. For purposes of the present invention, the act of "selecting" a product includes any manifestation of interest by the entity in the product, e.g., on-line browsing; selecting a product for inclusion in a shopping cart, asking for info, etc. In a currently preferred embodiment, the web client allows an entity (such as an individual, organization or any uniquely identifiable party) to request and obtain information from, or submit information to, the one or more web servers 304. To the extent that such requested/submitted information manifests an entity's interest in one or more products, they may be regarded as selected products. The back end system 202 may directly monitor the activity of the web client 302 or may be provided with the relevant information through the web server(s) 304 or other sources.

As in FIG. 2, the product descriptions are preferably provided through web sites and web pages maintained by retailers, etc. In this case, the back end system 202 may directly access the relevant web sites to obtain the new descriptions. As noted above, although web-based sources of descriptions are presently preferred, the instant invention is not necessarily limited in this regard. Once again, suitable product descriptions may come from virtually any source provided that the descriptions may be reduced to a format whereby the back end system 202 is able to analyze them, e.g., manually entered into a computer, scanned and automatically recognized, etc.

Regardless of the source of the descriptions, the back end system 202 may perform the processing described herein to extract attributes and values of products as well as establish attribute-value pairs that serve as a basis for meaningfully describing products. The resulting attributes, values and/or attribute-value pairs may then be stored in the database 208 as part of a larger knowledge base, or may be provided to the web client 302, the web server(s) 304 or to a third party 310. For example, an individual browsing a retailer's web site may wish to see how his or her selections are perceived in terms of the defined attributes. Conversely, a retailer implementing a web site on the web server(s) 304 may wish to understand how its product offerings are perceived. Further still, one retailer (e.g., a third party 310) may want to know the attributes of a competitor's product line.

Figure 4:
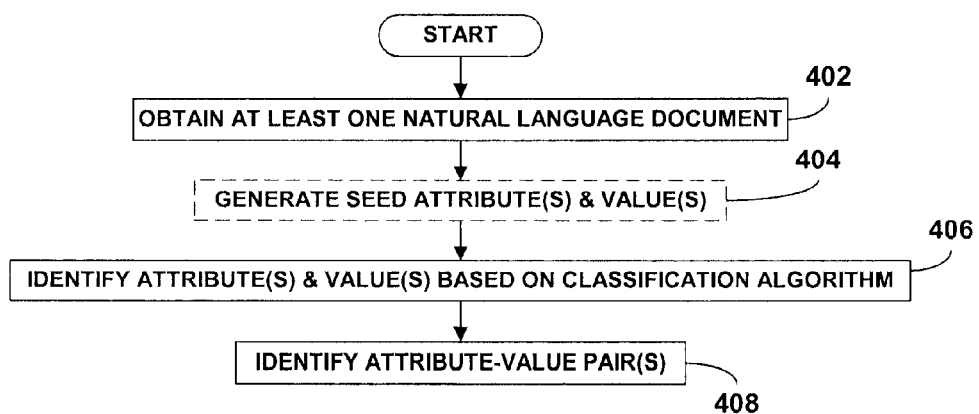
FIG. 4 is a flowchart illustrating processing in accordance with one embodiment of the present invention.

Referring now to FIG. 4, a process in accordance with an embodiment of the present invention is illustrated in flowchart form. In particular, the processing illustrated in FIG. 4 illustrates a technique for identifying attributes and values in natural language documents using a classification algorithm and, thereafter, identifying attribute-value pairs from the extracted attributes and values. In a presently preferred embodiment, the processing of FIG. 4 is carried out using executable instructions stored on a suitable computer-readable medium that are executed by a computer. However, as known to those having skill in the art, other techniques may be used to implement the processing of FIG. 4.

At block 402, at least one natural language document that is descriptive of a product is obtained using, for example, the web crawler embodiment described above. Thereafter, at block 404, seed attributes and corresponding seed values may be optionally generated based on the at least one natural language document. Depending on the type of classification algorithm employed, seed attributes and seed values may or may not be needed. In particular, if a supervised or semi-supervised classification algorithm is employed, such seed attributes and seed values are necessary. Conversely, if an unsupervised classification algorithm is used by itself, such seeds are not necessary.

Regardless, processing continues at block 406 where attributes and values of the product are extracted using a classification algorithm as applied to the at least one natural language document. (Note that the terms "extracting" and "identifying" as applied to attributes and values are used synonymously throughout this disclosure.) The present invention may equally employ unsupervised, supervised or semi-supervised classification algorithms alone, or in combinations thereof, for this purpose. As described in greater detail below, a preferred embodiment of the present invention uses an unsupervised classification algorithm for seed generation (i.e., identification of seed attributes and values) and a combination of a supervised classification algorithm and a semi-supervised classification algorithm for the identification of attributes and values. Having identified at least one attribute and at least one value, processing continues at block 408 where attribute-value pairs are identified within the it least one attribute and the at least one value. The processing of block 408 is described in further detail with reference to FIG. 5.

Figure 5:
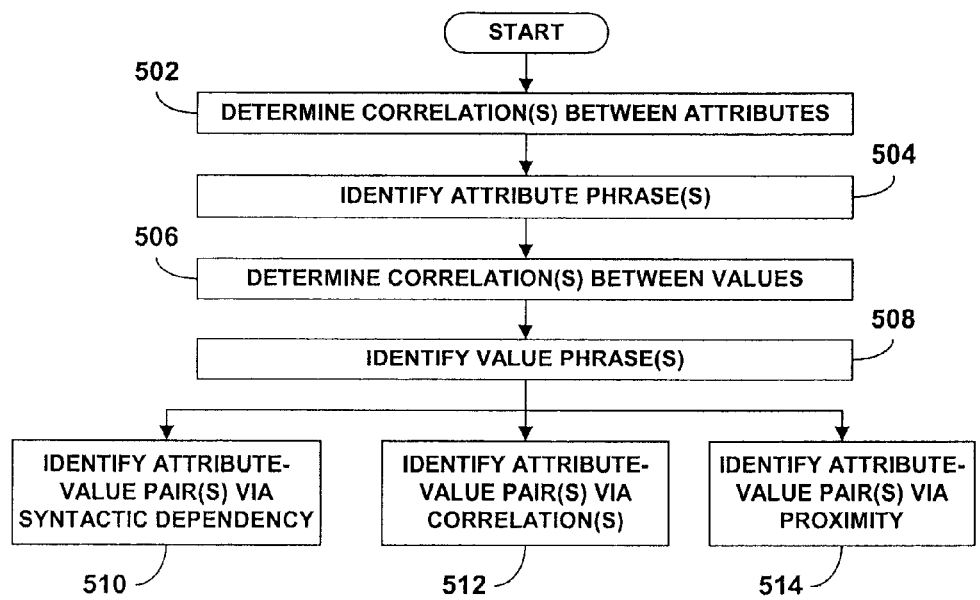
FIG. 5 is a flowchart illustrating processing in accordance with another embodiment of the present invention.

FIG. 5 illustrates a presently preferred technique for establishing attribute-value pairs based on previously-identified, but otherwise unlinked, attributes and values. Once again; the processing of FIG. 5 is preferably carried, out using executable instructions stored on a suitable computer-readable medium that are executed by a computer, although it is further understood that other implementation techniques may be equally employed. In the process of establishing attribute-value pairs, words of certain parts of speech, namely most closed-class items, are excluded. For example, prepositions, conjunctions, etc., are not good candidates for attributes or values, and thus are not extracted. With this understanding, an initial operation (not shown in FIG. 5) is to assign labels based on already known pairs, namely the pairs extracted as seed attributes and corresponding seed values by the unsupervised classification algorithm. Whenever instances of such extracted pairs are encountered, they are appropriately labeled as attributes or values and a link is establish between them so that they form a pair. As known in the art, a variety of techniques may be employed to establish such links, such as establishing a pointer from an attribute that points to its corresponding value, or vice versa.

At block 502, one or more correlation metrics (as described below) are determined between attributes within a given document. Thereafter, at block 504, one or more attribute phrases, i.e., two or more words each labeled as attributes that should be merged together, are identified based on the correlation metrics determined at block 502. In a similar vein, at block 506, the same type of correlations are calculated between words identified as values within the document and, at block 508, one or more value phrases are identified based on the value correlation metrics. Although illustrated as separate blocks, the determinations of correlations at blocks 502 and 506 are essentially identical regardless whether the words are attributes or values and may be implemented as a single process, i.e., computed once for all the data and subsequently accessed as needed. Regardless, thereafter, at blocks 510-514, one or more techniques may be employed to link (or, equivalently, associate) attributes (or attribute phrases) with corresponding values (or value phrases) to thereby establish attribute-value pairs. Generally, the techniques implemented by each of blocks 510-514 establishes respective selection criteria and calculates metrics between attributes and values for comparison with the corresponding selection criteria. Thus, at block 510, syntactic dependencies, as described below, are determined between attributes and, where the existence of syntactic dependencies are identified, used to establish links between attributes and values. At block 512, correlations metrics, like those employed in blocks 502 and 506, are calculated between attributes and values. Where the correlations surpass one or more thresholds, links are again established between attributes and values. Finally, at block 514, a straightforward proximity test is used to link attributes and values; that is, immediately adjacent attributes and values are linked. FIGS. 4 and 5 provide high level overviews of processing in accordance with the present invention. However, a more detailed understanding of the processing of FIGS. 4 and 5 may be obtained with reference to the remaining Figures.

Figure 6:
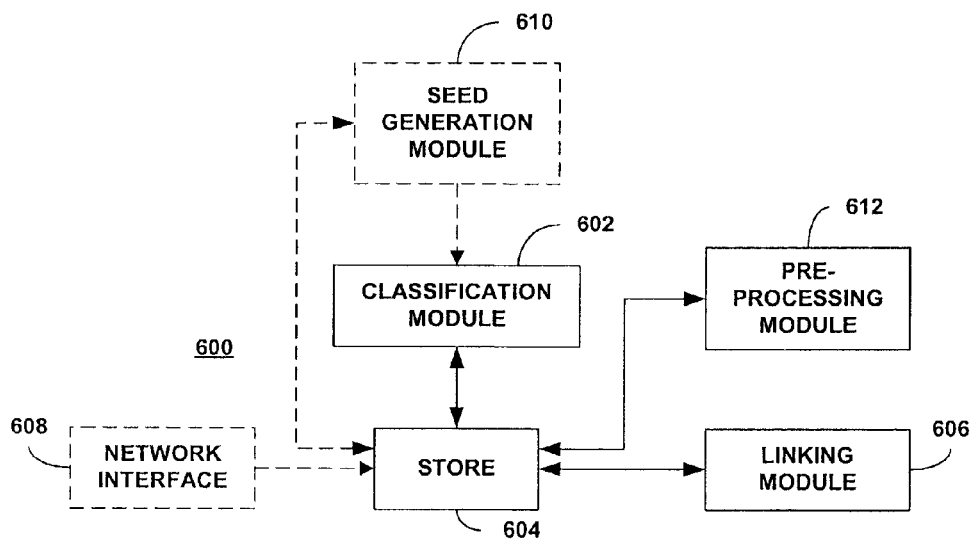
FIG. 6 is a block diagram of an implementation of an apparatus in accordance with the present invention.

Referring now to FIG. 6, a more detailed illustration of an implementation of the present invention is shown. In particular, an apparatus or device 600 comprises a classification module 602 in communication with a storage device 604. The storage device 604 is further in communication with a linking module 606 and a seed generation module 610 and, optionally, a network interface 608. In this manner, the storage device 604 essentially acts as a means for passing data between modules. However, as known to those, having skill in the art, this is not a requirement and the separate modules could, in practice, communicate directly with one another. In a presently preferred embodiment, the modules illustrated in FIG. 6 are preferably implemented using one or more suitably programmed computers or similar devices, with the illustrated storage device 604 and network interface 608 being provided as part of the hardware/firmware of the computer(s). However, it is understood that some or all of the components illustrated in FIG. 6 could be implemented using, other techniques, such as programmable logic arrays, application-specific integrated circuits, state machines, etc. or even manual processing.

The classification module 602 implements a classification algorithm that operates upon at least one natural language document stored in the storage device 604. When provided, the network interface 608 (which may comprise, for example, a physical network connection and a corresponding software driver suitable for terminating the network protocol) may be used to receive the at least one natural language document using any of the previously described techniques, e.g., a web crawler. However, the present invention is not limited in this regard and other techniques may be equally employed to obtain natural language documents. Regardless of the manner in which they are obtained, the natural language documents are operated upon by the classification module 602 in order to extract one or more attributes and values, which attributes and values are subsequently stored in the storage device 604. The classification module 602 implements any one of an unsupervised classification algorithm, a supervised classification algorithm, a semi-supervised classification algorithm or combinations thereof, specific examples of which are described in greater detail below.

A preprocessing module 612 is provided to operate upon the at least one-natural language document in order to bring such documents into suitable condition for analysis by the classification module 602. First, the data is preferably tagged with parts of speech, i.e., the part of speech for each word in a given document is identified, using a so-called Brill tagger as described in "Transformation-based error driven learning and natural language processing: A case study in part of speech tagging", E. Brill, *Computational Linguistics*, 1995, 21(4): 552-565. Second, the data is preferably stemmed, i.e., any suffixes are stripped, from words to provide only the stem portion of each word, using, for example, a so-called Porter stemmer as described in "An algorithm for suffix stripping", M. F. Porter, *Program*, 1980, 14(3): 130-137. This stemming procedure ensures that the data (i.e., the words in each document) are normalized by mapping morphological variations of words to the same token.

In order to more fully generalize the data, all numbers in a document are preferably replaced with a unique token, e.g., #number#. Numerical tokens of substantially all forms are recognized, e.g., fractions, scientific notation, floating point numbers, and spelled out numbers (e.g., two). As many values for attributes are numerical values, normalizing the data in this way allows the collection of many more unlabeled data items for a given pattern or context, as described in greater detail below. For the same reason, all units of measure (e.g., liter, kg) are also replaced by a unique token, e.g., #measure#.

Additionally, the preprocessing module 612 uses several well-known techniques for calculating correlation scores between all pairs of words. For example, Yule's Q statistic, mutual information, as well as the $\chi^2$ scores are calculated. Using all three of these methods allows for high precision recognition of phrases. For example, a pair of words may be recognized as a phrase if all three of its correlation scores exceed thresholds. Furthermore, sequences of words may be recognized as phrases if two or more words in a row exceed these thresholds.

The linking module 606 operates upon the attributes and values stored in the storage device 604 by the classification module 602 to establish attribute-value pairs within one or more of the at least one natural language documents. As described in greater detail below, the process of establishing such pairs is preferably based on a variety of techniques including correlation values, syntactic dependencies and proximity. Regardless, once determined, the attribute-value pairs are preferably stored in the storage device 604.

Finally, the device 600 may include a seed generation module 610 that operates upon the at least one natural language document to provide seed attributes and corresponding seed values as input to the classification module 602. In a presently preferred embodiment, the seed generation module 610 implements an unsupervised classification algorithm that extracts relatively few, but accurately identified, attribute-value pairs from training data. The approach uses correlation scores to find candidates, and makes use of parts of speech tags by excluding certain words from being candidates for extraction. As such, the presently preferred unsupervised seed extraction is performed after the pre-processing operations described above. However, it is understood that other seed generation approaches, up to and including manual seed determinations, may be equally employed.

Generally, extracting attribute-value pairs is related to the problem of phrase recognition (i.e., which consecutive words constitute a phrase) in that both methods aim at extracting pairs of highly correlated words. There are however differences between the two problems. Consider the following two sets of phrases:

| back | pockets |
| front | pockets |
| zip | pockets |

Versus:

| Pittsburgh | Steelers |
| Chicago | Bears |

The first list contains an example of an attribute with several possible values. The second list contains phrases that are not attribute-value pairs. The biggest difference between the two lists is that attributes generally have more than one possible value, as in the above example. This observation is exploited to automatically extract high-quality seeds in an unsupervised fashion by defining a modified mutual information metric as follows.

All bigrams $w_i w_{i+1}$ are considered as candidate attribute-value pairs, where $w_i$ is a potential value, and $w_{i+1}$ is a candidate attribute. Although it is not always the case that the modifying value occurs (directly) before its attribute, this heuristic allows the extraction of seeds with high precision. Of course, other such heuristics could be employed, e.g., adjectives followed by nouns that often correspond to value/attribute (in that order) pairs, as a matter of design choice. Suppose word w (in position i+1) occurs with n unique words $w_{1 \ldots n}$ in position i. The words $w_{1 \ldots n}$ are ranked by their associated conditional probabilities $p(w_j|w)$, $w_j \in w_{1 \ldots n}$, where the word $w_j$ with the highest conditional probability is ranked highest.

The words $w_j$ that have the highest conditional probability are candidates values for the candidate attribute w. Clearly, however, not all words are good candidate attributes. However, it is noted that attributes generally have more than one value and typically do not occur with a wide range of words. For example, frequent words such as the occur with many different words. This is indicated by their conditional probability mass being distributed over a large number of words. The desired situation occurs where few words account for a high proportion of the probability mass. For example, both Steelers and on will not be good candidates for being attributes. Steelers typically only occurs after Pittsburgh so all of the conditional probability mass will be distributed on one value whereas on occurs with many words with the mass distributed over too many values. Identification of suitable cases is preferably accomplished in two phases: in the first phase, enough words $w_i$ are retained to account for a part z, $0<z<1$ of the conditional probability mass $\Sigma_{j=1}^{k} p(w_j|w)$. In a presently preferred embodiment, z is set to 0.5 although other values may be equally employed as a matter of design choice.

In the second phase, a cumulative modified mutual information is computed for all candidate attribute-value pairs. Once again, consider the perspective of the candidate attribute. If there are a few words that together have a high mutual information with the candidate attribute, then that word is likely to be an attribute, along with (some of) its values. The cumulative modified mutual information is defined as follows:

Let $p(w, w_{1 \ldots k}) = \Sigma_{j=1}^{k} p(w, w_j)$. Then:

$$cmi(w_{1 \ldots k}; w) = \log \frac{p(w, ww_{1 \ldots k})}{\left( \lambda * \sum_{j=1}^{k} p(w_j) * (\lambda - 1) * p(w) \right)}$$

$\lambda$ is a user-specified parameter, where $0 \leq \lambda < 1$. Experiments have found that setting $\lambda$ close to 1 yields robust (relatively accurate) results. Setting $\lambda$ close to 0 implies that a candidate pair is not penalized for the word w being frequent, as long as few words cover most of its conditional probability mass. In essence, each cumulative modified mutual information measures how much a word predicts several other words that commonly occur with it. Thus, higher cumulative modified mutual information values are increasingly favorable in the sense that they have a higher probability of corresponding to a valid attribute-value pair or pairs.

Table 1 below lists several examples of extracted attribute-value pairs using the above-described technique taken from documents describing sporting goods related to tennis, and football.

TABLE 1

Automatically (unsupervised) extracted seed attribute-value pairs

| values | attribute |
|---|---|
| carrying | case |
| storage | |
| main | compartment |
| racquet | |
| ball | pocket |
| welt | |
| side-seam | |
| key | |
| coat | steel |
| durable | |

It should be noted that not all extracted pairs are actual attribute-value pairs. One typical example of an extracted incorrect pair are first name-last name pairs, e.g., Smith is extracted as an attribute as it occurs as part of many phrases and, fulfills the criteria (Joe Smith, Mike Smith, etc.) after many first names. Other examples of incorrectly extracted attribute-value pairs include more (attribute)-much (value) and more (attribute)-achieve (value). However, experimentation has shown that some of the incorrectly extracted examples are rare enough that they do not have much impact on subsequent processing.

Figure 7:
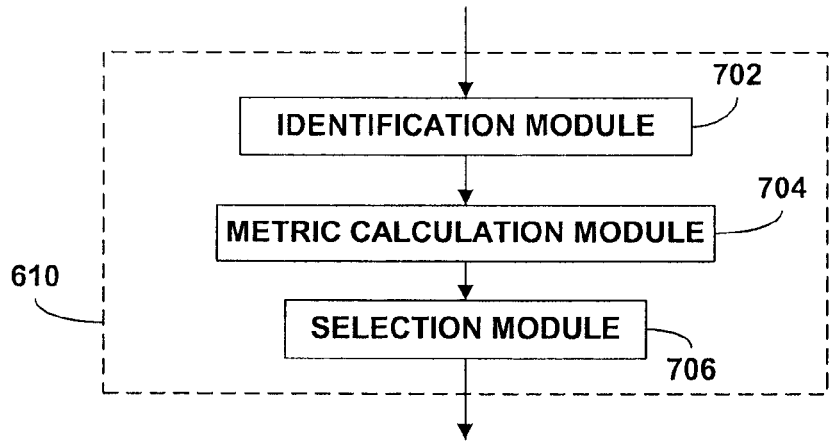
FIG. 7 is a block diagram of a preferred implementation of an unsupervised seed generation module in accordance with one embodiment of the present invention.

An implementation of the unsupervised classification algorithm 610 described above is further illustrated with reference to FIG. 7. As with previous embodiments, the implementation of FIG. 7 is preferably carried out using software programming techniques, although it is understood that other implementations are possible. As shown, the unsupervised classification algorithm 610 comprises an identification module 702 that operates upon the at least one-natural language document to identify a plurality of candidate attribute-value pairs. Thus, the identification module 702 preferably computes the associated conditional probabilities, described above, and selects as candidate values those potential values corresponding to the highest valued associated conditional probabilities. The resulting candidate attribute-value pairs are provided to the metric calculation module 704 that determines the cumulative modified mutual information metrics for each candidate attribute-value pair. The cumulative modified mutual information metrics, in turn, are employed by the selection module 706 to identify as attribute-value pairs, those candidate attribute-value pairs that have the most favorable metrics, i.e., higher values of cumulative modified mutual information metrics.

Figures 8, 10, 11, 12:
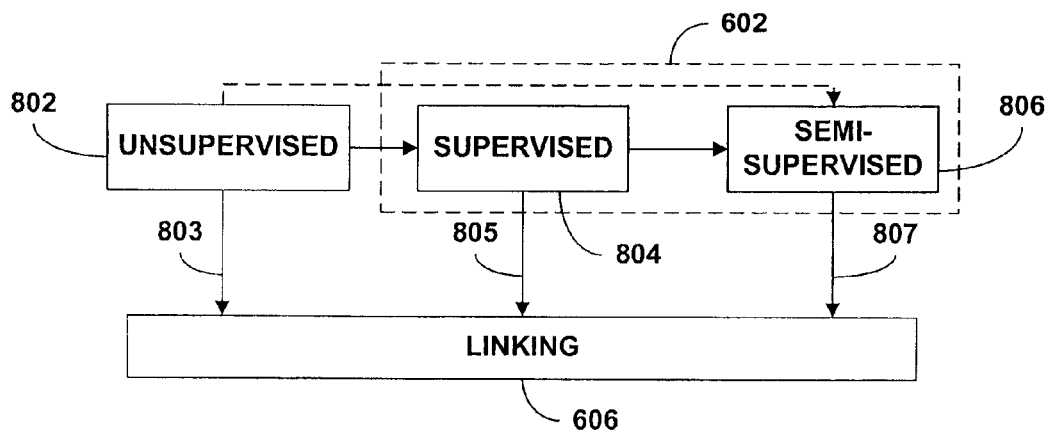

Referring now to FIG. 8, a presently preferred implementation of the classification module 602 is further illustrated. In particular, the classification module 602 is shown comprising a supervised classification algorithm 804 operating in conjunction with a semi-supervised classification algorithm 806. Both the supervised algorithm 804 and the semi-supervised algorithm 806 operate to provide both attributes and values 805, 807 to the linking module 606. As shown, the unsupervised seed generation module 802 also provides the seed attributes and corresponding seed values 803 to both the linking module 606 and the supervised algorithm 804. In a presently preferred embodiment, the seed attributes and corresponding seed values 803 are also provided to the semi-supervised algorithm 806, as illustrated by the dashed arrow. Further still, as shown, attributes and values extracted by the supervised algorithm 804 are provided to, and are indeed necessary for the operation of, the semi-supervised algorithm 806 for further identification of additional attributes and values.

As noted above, the approach adopted by the present invention to extract attributes and values is to treat the extraction as a classification problem where each word (or phrase) can be classified in one of a number of predefined classes. As an initial approach, the supervised algorithm 804 is employed using the generated seeds 803. In particular, a so-called Naïve Bayes classifier is preferably used as the supervised algorithm 804. The initial attribute and value seeds are used to label training data (not shown in FIG. 8) that Naïve Bayes uses to "train" a classifier. Thereafter, the semi-supervised algorithm 806 is used to improve the performance of the Naïve Bayes algorithm by exploiting large amounts of unlabeled data that may be gathered relatively cheaply. That is, gathering product descriptions, for example, from retail web-sites is a relatively cheap process using simple web crawlers. The expensive part is labeling the words in the descriptions as attributes or values. Using the semi-supervised algorithm 806, the initial seeds (in this case, the labeled data output by the supervised algorithm 804, in addition to the seed attributes and values 803) are augmented with unlabeled product descriptions (not shown) collected as described above. As described in greater detail below, a presently preferred semi-supervised algorithm is the so-called co-EM algorithm.

In practice, the process of "extracting" attributes and values is essentially an exercise in labeling words. The initial labeling of words or phrases (sometimes collectively referred to herein simply as "words") is based on whether they match previously labeled data, e.g., the seed attributes and values 803, and is performed, in one embodiment, by the supervised algorithm 804 although such processing, could be performed as an entirely separate operation. Regardless, four classes are preferably used to probabilistically label individual words: unassigned, attribute, value, or neither. The probability distribution for each word defaults to unassigned. If an unlabeled word does not match the labeled data, this default remains as input for the classification algorithm. If the unlabeled word does, match the labeled data, then it is simply assigned the corresponding label. To facilitate this process, a stoplist, i.e., a list of words that are known in all cases to be neither an attribute or value, may be employed. Stoplist words are usually words that are extremely common, such as "the", "and", etc. and therefore aren't useful as attributes or values. Thus, if a word appears on the stoplist, it is tagged as neither. In some cases, it can happen that a word or phrase appears with more than one label. This is because the same word or phrase can have different labels in different contexts. For example, a numerical value (indicated by the #number# token) can appear as both an attribute and as a value. In such a case, partial probabilities can be assigned to each label by the supervised algorithm 804 with the assumption that the semi-supervised algorithm 806 will assign the appropriate label for the given context.

Words labeled as described above are then used as training data by the supervised classification algorithm 804. e.g., the Naïve Bayes algorithm, that classifies each word or phrase in the unlabeled data as an attribute, value, or neither. Techniques for implementing the Naïve Bayes algorithm are well known to those having ordinary skill in the art as described, for example, in Machine Learning by Thomas M. Mitchell (McGraw-Hill Higher Education 1997). In a presently preferred embodiment, the features used for classification are the words of each unlabeled data item, plus the surrounding eight words and their corresponding parts of speech.

As noted above, the labeling of attributes and values is an expensive process and it would be particularly advantageous to reduce the amount of labeled data required to train accurate classifiers. To this end, relatively easily obtained unlabeled product descriptions may be used with the semi-supervised algorithm 806 effectively combining small amounts of labeled data with large amounts of unlabeled data. In a presently preferred embodiment, a multi-view implementation (similar to co-training) is employed where each word can be described using multiple views (e.g., the word itself and the context in which it occurs). In particular, a co-EM semi-supervised algorithm is preferred. As described in "Analyzing the effectiveness and applicability of co-training", K. Nigam & R. Ghani, 2000, *Proceedings of the Ninth International Conference on Information and Knowledge Management* (CIKM-2000), co-EM is a multi-view, semi-supervised learning algorithm that combines features from both co-training and Expectation-Maximization (EM). Like EM, co-EM is iterative but uses the multiple views present in the data as in co-training. The presently preferred separate feature sets or views used herein are the word to be classified and the context in which it occurs.

Co-EM is a multi-view algorithm, and requires two views for each learning example. Each word or phrase (sometimes referred to herein as data items) is expressed in view1 by the stemmed word or phrase itself, plus the parts of speech as assigned by the Brill tagger. The view2 for this data item is a context of window size eight, i.e., four words (plus parts of speech) before and four words (plus parts, of speech) after the word or phrase in view1. If the context around a view1 data item is less than 8 words long, whatever context that is available is employed.

By default, all words are processed into view1 as single words. There are two exceptions: one is a phrase that matches the labeled data. In this case, the longest phrase possible is labeled and the entire phrase is treated as one view1 data item. In addition, correlation scores are used to detect phrases as described previously. When two or more words are recognized as a phrase, they are treated the same as a single word.

Co-EM proceeds by initializing a view1 classifier using the labeled data only. Then this classifier is used to probabilistically label all the unlabeled data. The context (view2) classifier is then trained using the original labeled data plus the unlabeled data with the labels provided by the view1 classifier. Similarly, the view2 classifier then re-labels the data for use by the view1 classifier, and this process iterates for a number of iterations or until the classifiers converge, i.e., when each classifier fails to label or re-label any data.

Each iteration consists of collecting evidence for each data item from all the data items in the other view that it occurs with. For example, if a view2 data item $view2_k$ occurs with view1 data items $view1_{i1}$ and $view1_{i2}$, then the probability distribution for $view2_k$ is the averaged distribution of the probabilities currently assigned to $view1_{i1}$ and $view1_{i2}$, weighted by the number of times $view2_k$ appears together with $view1_{i1}$ and $view1_{i2}$, respectively, as well as by the class probabilities, described below.

More formally, the co-EM algorithm can be expressed as follows: Let the unlabeled training examples be $view1_i$, $0<i<n_1$ and $view2_j$, $0<j<n_2$. Each pair of unlabeled training examples ($view1_i$, $view2_j$) co-occurs with frequency cooc($view1_i$,$view2_j$). Each training example also has a complete, frequency cnt($view1_i$) and cnt($view2_j$), respectively, where cnt($view1_i$)=$\Sigma_{j=0}^{n_2}$cooc($view1_i$,$view2_j$) and equivalently for view2. Let the classes be denoted as $c_k$, $0<k<4$. The classes are labeled as unassigned, attribute, value, and neither, respectively. The goal is to label unlabeled training, examples that are attributes or values, and leave the others unlabeled. Co-EM can be summarized by the following steps:

1. Initialize based on labeled data (see above).
2. Use view1 to label view2
3. Use view2 to label view1
4. Repeat steps 2 and 3 for n iterations or until convergence is reached.
5. Assign final labels to words:

$$P(c_k \mid \langle view1_i, view2_j \rangle) = \frac{P(c_k \mid view1_i) + P(c_k \mid view2_j)}{2}$$

When estimating class probabilities for labeling a view, each is estimated from the respective other view's probability distributions. When labeling view2 from view1, the class probabilities for the Naïve Bayes classifier are computed only on view1, without reference to the view2 data items. The resulting probability distributions, from these two approaches are the same. The class probabilities are thus estimated as follows:

$$P(c_j) = \frac{1 + \sum_{i}^{n_1} cnt_{view1_i} * P(c_j \mid view1_i)}{numclasses + \sum_{i}^{N} cnt_{view1_i}}$$

numclasses in the preferred embodiment is 4, for unassigned, attribute, value, and neither. The above formula is for those iterations where view2 is labeled from view1. The other iterations are defined analogously.

As with class probabilities, word probabilities from view1 are, used as training data for view2. For example, if a view1 element has a probability distribution of p(value)=0.5 and p(attribute)=0.5, then the data element is counted as a value example with weight 0.5, but also as an attribute example with weight 0.5.

For all words $view2_j$, estimate the new probability for each class $c_k$, $0<k<4$, from all words $view1_i$, $0<i<n_1$. In practice, the algorithm considers only those $view2_j$ items whose co-occurrence count with $view1_i$ is greater than zero.

$$P(view2_j \mid c_k) = \frac{1 + \sum_{i=1}^{n_1} cooc(view1_i, view2_j) * P(c_k \mid view1_i)}{numclasses + \sum_{i=1}^{n_1} cooc(view1_i, view2_j)}$$

Similarly, $$P(view1_i | c_k) = \frac{1 + \sum_{i=1}^{n_2} cooc(view1_i, view2_j) * P(c_k | view2_j)}{numclasses + \sum_{i=1}^{n_2} cooc(view1_i, view2_j)}$$

In accordance with standard statistical techniques (see, e.g., Foundations of Statistical Natural Language Processing by Chris Manning and Hinrich Schütze (MIT Press May 1999)), the "1" in the numerator and the numclasses in the denominator of the above equations are added to provide smoothing, i.e., to deal with zero probabilities.

In each iteration, the computed class and word probabilities are used to label unlabeled data items in the respective other view. This is done as follows:

$P(c_k|view2_j) \propto P(c_k)*P(view2_j|c_k)$ if $view2_j$ does not match the labeled training data.

After computing the probabilities for all classes, renormalization occurs according to:

$$P(c_k | view2_j) = \frac{P(c_k | view2_j)}{\sum_{k=1}^{4} P(c_k | view2_j)}$$

Similarly, $P(c_k|view1_i) \propto P(c_k)*P(view1_i|c_k)$ if $view1_i$ does not match the labeled training data.

Again, renormalization is necessary after computing the probabilities for each class:

$$P(c_k | view1_i) = \frac{P(c_k | view1_i)}{\sum_{k=1}^{4} P(c_k | view1_i)}$$

However, if $view1_i$ matches the labeled training data, $P(c_k|view1_i)$=InitialLabeling.

Analogously for the other direction.

After co-EM is run for a pre-specified number of iterations, final co-EM probability distributions are assigned to all $\langle view1_i, view2_j \rangle$ pairs as follows:

$$P(c_k | \langle view1_i, view2_j \rangle) = \frac{P(c_k | view1_i) + P(c_k | view2_j)}{2}$$

It should be noted that words that are tagged as attributes or values are not necessarily extracted as part of an attribute-value pair in the linking phase. As described in greater detail below, they will only be extracted if they form part of a pair, or if they occur frequently enough by themselves or as part of a longer phrase.

Various examples illustrating operation of the co-EM, semi-supervised algorithm are further illustrated with reference, to FIGS. 10-16. Starting with FIG. 10, a word 1004 under consideration (i.e., within the view1 classifier described above) is provided with its surrounding context 1002, 1006 (i.e., the view2 classifier described above). Based on previously labeled data, the word 1004 is labeled 1008 as a value. As a result, the context 1002, 1006 is likewise identified 1102, 1104 as a value context, as shown in FIG. 11. Thereafter, as illustrated in FIG. 12, re-occurrence of the same context 1202, 1206 results in a similar identification 1208, 1210 as a value context. As a result, the intermediate word 1204 is labeled 1212 as a value given the probability of the value context 1208, 1210. As shown in FIG. 13, this same process of recognizing contexts 1302, 1306, similarly identifying them 1308, 1310 and inferring a label 1312 of an intermediate word 1304 may be repeated as often as possible. In essence, FIGS. 10-13 illustrate an example of using labeled data to probabilistically identify, in this case, a value context and subsequently using the labeled context (as well as the contexts, e.g., view2's) to further label (identify) additional values. That is, whether "trail-running" 1304 will be tagged as a value depends also on the probabilities dictated by all the other contexts in which it appears.

Use of this acquired knowledge to leverage further labeling, particularly of attributes, is illustrated in FIGS. 14-16. As shown in FIG. 14, the process described above with reference to FIGS. 10-13 can once again be used to identify a context 1402, 1406 as a value context 1410, 1412 based on a previously-labeled value 1404, and thereafter using reoccurrence of the identified context 1414, 1418 to further label another word 1416 as a value 1408. Because the value 1408 occurs within the context 1414, 1418; it therefore possible to inferentially identify both portions of the context 1414, 1418 as likely attributes 1502, 1504, i.e., to assign a probability that both halves of the context 1414, 1418 are more likely than not to fall within the attribute classification since attributes tend to occur around values and vice versa. Thereafter, as shown in FIG. 16, reoccurrence of the second half of the context 1604 along with a previously labeled value 1602 increases the probability that the second half of the context 1604 is properly labeled as an attribute 1606. Conversely, that the first half of the context 1414 did not occur in conjunction with the subsequent example decreases the probability that the first half of the context 1414 is an attribute resulting in a label as a possible attribute, i.e., reassigning a lower probability that the first half of the context 1414 will fall within the attribute classification. In effect, the examples illustrated in FIGS. 10-16 illustrate how the co-EM algorithm carries an iterative process of using different views to label previously unlabeled words and "bootstrapping" the newly labeled words to perform further labeling.

After the classification algorithm has assigned a (probabilistic) label to all (or as many as possible) unlabeled words, additional processing remains: using these labels to tag attributes and values in the actual product descriptions, i.e., in the original data, and finding correspondences between words or phrases tagged as attributes and values sufficient to confidently identify attribute-value pairs. As part of this process, it may be necessary to identify words, tagged with the same label, that should be merged to form attribute phrases or value phrases. Thereafter, links or association between attributes (or attribute phrases) and their corresponding values (or value phrases), are established to form attribute-value pairs. Thus, attribute-value pair identification can be divided into two high-level tasks: merging words having the same label into phrases, and associating values with the attributes that they describe. In a presently preferred embodiment, this is accomplished according to the following process implemented by the linking module 606:

1. Link based on seed pairs.
2. Merge words of the same label into phrases if their correlation scores exceed a threshold
3. Link attribute and value, phrases based on directed or syntactic dependencies.

4. Link attribute and value phrases if they exceed a correlation score threshold.

5. Link attribute and value phrases based on proximity.

6. Adding known, but not overt, attributes: material, country, and/or color.

7. Extract binary attributes, i.e., attributes without values, if they appear frequently or if the unlabeled data item consists of only one word.

A more detailed view of the linking module 606 is further illustrated with reference to FIG. 9. As shown, the linking module 606 comprises a correlation module 902, a phrase determination module 904, a syntactic dependency module 906, a storage component 908, an association module 910 and a proximity module 912 in communication with each other as shown. The correlation module 902 takes the attributes and values, determined in accordance with the previously described techniques, and calculates correlations between the attributes (i.e., the words that have been labeled as attributes) and correlations between the values (i.e., the words that have been labeled as values). In a presently preferred embodiment, the correlation metric used by the correlation module 902 is the standard Yule's Q statistic, although other correlation metrics could be equally employed in place of, or in addition to, the Yule's Q statistic.

Figure 17:
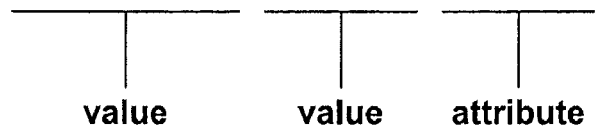
FIGS. 17-19 illustrate association of attributes and values in accordance with an embodiment of the present invention.
Figure 18:
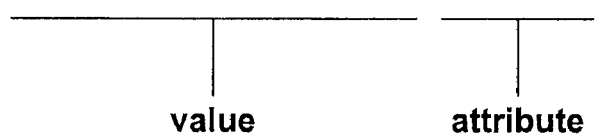

The resulting correlations 920 are passed to the phrase determination module 904. Generally, the phrase determination module 904 ascertains if two adjacent words (or words that are separated only by a closed-class item, which is not be labeled) are tagged with the same label, and if these two words have a sufficiently high correlation score. If these conditions are met, the two words are merged by the phrase determination module 904 into a phrase (including the closed-class items, if any). The threshold used by the phrase determination module 904 is generally lower than that employed in the phrase extraction phase described above relative to the preprocessing module 612: two words can form an attribute (or value) phrase if they appear together sometimes, even if their correlation score is not high enough for them to be recognized as a phrase. For example, the phrase polycotton blend tape should together be considered a phrase if each of the words has the same label, even though polycotton blend tape is not recognized as a phrase in the preprocessing step, because tape occurs in many other contexts as well. The process of determining phrases is further illustrated with reference to FIGS. 17 and 18. As shown in FIG. 17, a sentence, for example, may comprise two adjacent words that are similarly labeled, in this case the values synthetic and leather. When the correlation metric between these adjacent words exceeds the necessary threshold, which may be selected as a matter of design choice, they are merged into a single phrase having the same label as before, as illustrated in FIG. 18.

After creating sets of attribute words and sets of value words where possible, the next task is to establish links between them so as to obtain attribute-value pairs. It is not uncommon that an unlabeled data item contains more than one attribute-value pair, and in this case establishing the link between attributes and values is complicated by the fact that there are multiple attributes and multiple values. The establishment of links between attributes and values also serves as a means to filter out attributes and values that were extracted, but for which there is no word or phrase of the opposite label to form a pair with. In such cases, the extracted attribute or value is likely statistically "noisy", and should not be output.

In a presently preferred embodiment, as described above relative to FIG. 5, links are established using three mechanisms, preferably executed in a specific order, meaning that less preference is given to links that are established by the successively later mechanisms. However, this ordered determination using the different mechanisms is not a requirement; different orders may be used, or any single mechanism or combination of mechanisms may be equally employed as a matter of design choice.

Figure 19:
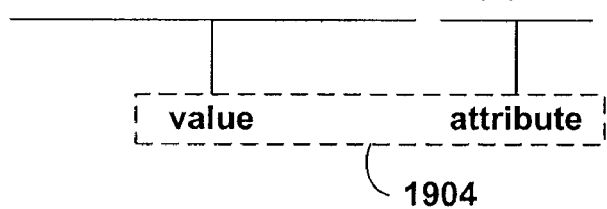

As illustration of the preferred embodiment, the first mechanism used to establish pairs is syntactic dependencies. To this end, the output of the phrase determination module 904, i.e., that at least one attribute phrase and/or at least one value phrase 922 as identified by the newly labeled phrases, is provided to the syntactic dependency module 906 along with the other attributes and values. In a presently preferred embodiment, the so-called Minipar dependency parser, described by D. Lin, "Dependency-based evaluation of MINIPAR", 1998, *Workshop on the Evaluation of Parsing Systems*, is used to identify links between words labeled as attributes and values. For each sentence, the Minipar parser lists all dependency pairs. For example, in Top quality leather cover, Minipar parses leather as a dependent of cover. Most of the unlabeled data items are not complete sentences; Minipar is generally able to assign dependencies even for incomplete sentences, but in some cases it does not do so correctly. Despite this, Minipar can be leveraged to successfully establish links. This is done as follows: for every attribute/attribute phrase and, value/value phrase, if there is at least one word in the attribute phrase that is linked (via a dependency) to a word in the value phrase, a link is established between the two. It is currently preferred to only consider directed links, meaning a link is established only if the attribute word is the governor and the value is the dependent, e.g., cover being the governor and attribute of the dependent value leather. The resulting attribute-value pairs 924 are thereafter stored in storage component 908, which may comprise any manner of machine-readable storage device, such as magnetic storage media, etc. In a presently preferred embodiment, the entire sentence in which the attribute-value pair occurs, plus the actual words of the extracted pair, is stored. The use of syntactic dependencies, is further illustrated in FIG. 19 where a dependency 1902 is identified between the previously-determined value phrase synthetic leather and the attribute upper. In this manner, an attribute-value pair 1904 is identified.

After syntactic dependency, links between attributes and values may be established based on the correlation scores of the candidate words. Thus, in addition to the correlations between similarly labeled words used by the phrase determination module 904, the correlation module also computes correlations between words having different labels, i.e., attributes and values. To this end, the correlation module 902 preferably uses Yule's Q statistic and provides the resulting correlations 930 to the association module 910. The association module 910 operates to identify pairs of dissimilarly labeled words with high correlation values, i.e., surpassing a threshold value. If such pairs are identified, a link is established and the resulting attribute-value pairs 932 are stored in the storage component 908.

Finally, the proximity module 912 links any remaining attributes and values or attribute phrases or value phrases 922 (i.e., any remaining attributes/attribute, phrases and values/value phrases that have not been linked according to any of the previous methods) based simply on proximity. Thus, in a preferred embodiment, any unaffiliated attributes and values that are adjacent are linked together. Once again, the attribute-value pairs 940 identified in this manner are stored in the storage component 908. In this manner, a plurality of attribute-value pairs may be stored for later recall when it is desired to describe the product using attribute-value pairs. Of course, the process of generating attribute-value pairs can be repeated for multiple products, thereby creating a database of attribute-value pair "vectors", each being descriptive of a corresponding product.

Figure 9:
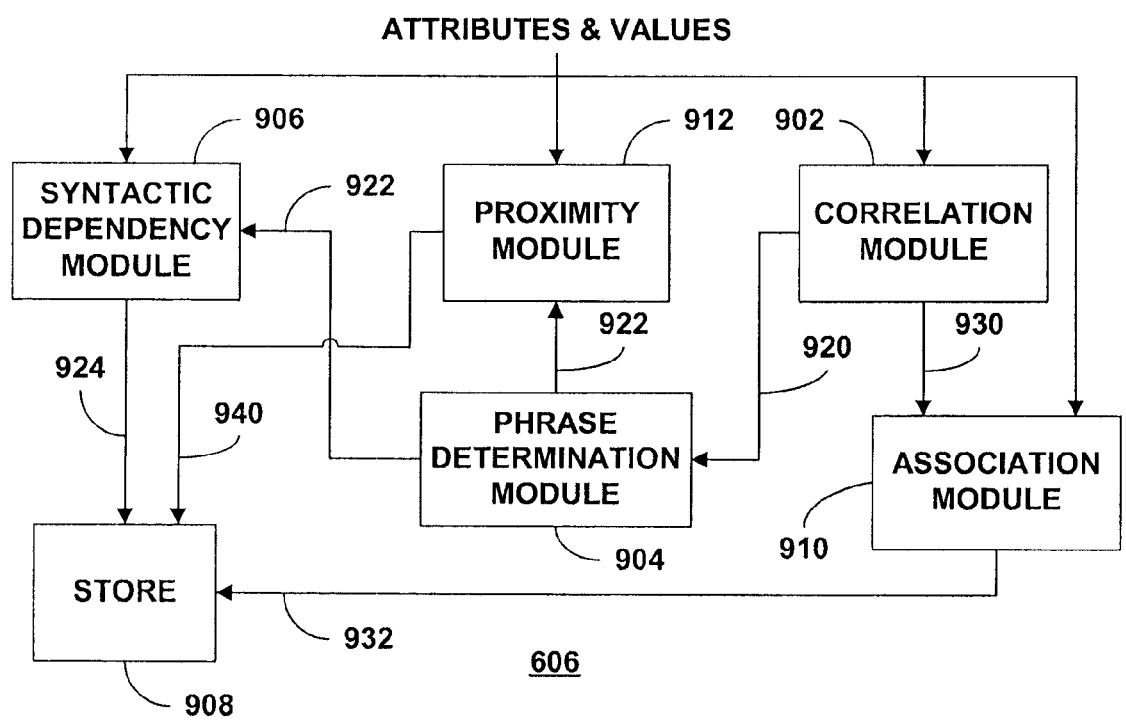
FIG. 9 is a block diagram of a preferred implementation of a linking module in accordance with the present invention.

Although not shown in FIG. 9, other methods may be employed to assess any remaining unaffiliated (i.e., unlinked) attributes and values. Attributes with binary values, e.g., true or false, may be present in the data. For example, the data item Imported is a valid attribute with two possible values: true or false, where the value is simply assigned by the absence or presence of the attribute. In a presently preferred embodiment, only those attributes that are single word data items and those attributes that occur frequently in the data as a phrase are extracted in this manner. Further still, attributes that are not present in the data may be added. That is, if an extracted value appears on the list of countries, colors, and materials, it may be desirable to automatically assign the appropriate attribute. This attribute (country, color, or material) is added to any existing attribute words for this value. For example, the data item leather upper would result in the attribute-value pair #material# upper-leather, i.e., the material of the upper part of the product is leather.

As described above, the present invention provides a technique for automatically extracting product attributes and values from one or more natural language documents. This is achieved by treating the task as a classification problem and using one or more classification algorithms to classify words and/or phrases in natural language documents as attributes, values or neither. Based on the attributes and values identified in this manner, further processing is performed to identify (extract) attribute-value pairs that are descriptive of the product. For at least these reasons, the present invention represents an advancement over prior art techniques.

While the particular preferred embodiments of the present invention have been shown and described, it will be obvious to those skilled in the art that changes and modifications may be made, without departing from the teachings of the invention. It is therefore contemplated that the present invention cover any and all modifications, variations or equivalents that fall within the scope of the basic underlying principles disclosed above and claimed herein.

What is claimed is:

1. A method for extracting at least one attribute and at least one value for a product based on at least one natural language document comprising unlabeled data, the method comprising:
    labeling, by a computer, at least a portion of the unlabeled data as the at least one attribute for the product via at least one classification algorithm operating upon the at least one natural language document;
    labeling at least another portion of the unlabeled data as the at least one value for the product via the at least one classification algorithm operating upon the at least one natural language document;
    for at least two attributes of the at least one attribute, calculating correlation values between each of the at least two attributes;
    for at least two values of the at least one value, calculating correlation values between each of the at least two values;
    merging attributes of the at least two attributes having correlation values above a correlation threshold;
    merging values of the at least two values having correlation values above the correlation threshold; and
    storing the at least one attribute and the at least one value.

2. The method of claim 1, wherein the at least one classification algorithm comprises a supervised classification algorithm.

3. The method of claim 1, wherein the at least one classification algorithm comprises a semi-supervised classification algorithm.

4. The method of claim 1, wherein the at least one classification algorithm comprises an unsupervised classification algorithm.

5. The method of claim 1, further comprising:
    obtaining the at least one natural language document via a public communication network.

6. The method of claim 1, further comprising:
    associating one of the at least one attribute with one of the at least one value to provide an attribute-value pair; and
    storing the attribute-value pair.

7. The method of claim 6, further comprising associating the attribute with the value based on selection criteria to provide the attribute-value pair.

8. The method of claim 1, further comprising:
    generating seed attributes and corresponding seed values, wherein generating the seed attributes and the seed values further comprises identifying the seed attributes and the corresponding seed values via an unsupervised classification algorithm as applied to the at least one natural language document; and
    wherein labeling the at least one attribute and the least one value further comprises labeling the at least one attribute and the at least one value via the at least one classification algorithm operating upon the at least one nature language document based on the seed attributes and the corresponding seed values.

9. An apparatus for extracting at least one attribute and at least one value for a product based on at least one natural language document comprising unlabeled data, comprising:
    a classification algorithm module, implemented by a processor executing instructions stored by a storage device, operative to label at least a portion of the unlabeled data as the at least one attribute via at least one classification algorithm operating upon the at least one natural language document and to label at least another portion of the unlabeled data as the at least one value for the product via the at least one classification algorithm operating upon the at least one natural language document;
    a linking module, implemented by the processor executing instructions stored by the storage device, operative to calculate correlation values between each of at least two attributes of the at least one attribute, calculate correlation values between each of at least two values of the at least one value, merge attributes of the at least two attributes having correlation values above a correlation threshold and merge values of the at least two values having correlation values above the correlation threshold; and
    a machine readable store operative to store the at least one attribute and the at least one value.

10. The apparatus of claim 9, wherein the classification algorithm module comprises a supervised classification algorithm.

11. The apparatus of claim 9, wherein the classification algorithm module comprises a semi-supervised classification algorithm.

12. The apparatus of claim 9, wherein the classification algorithm module comprises an unsupervised classification algorithm.

13. The apparatus of claim 9, further comprising:
a network interface operative to obtain the at least one natural language document via a public communication network.

14. The apparatus of claim 9, wherein the
linking module is further operative to associate one of the at least one attribute with one of the at least one value to provide an attribute-value pair,
wherein the machine readable store is further operative to store the attribute-value pair.

15. The apparatus of claim 14, wherein the linking module is further operative to associate the attribute with the value based on selection criteria to provide the attribute-value pair.

16. The apparatus of claim 9, further comprising:
a seed generation module operative to provide seed attributes and corresponding seed values, and further operative to identify the seed attributes and the corresponding seed values via an unsupervised classification algorithm as applied to the at least one natural language document,
wherein the classification algorithm module is further operative to label the at least one attribute and the at least one value via the at least one classification algorithm operating upon the at least one natural language document based on the seed attributes and the corresponding seed values.

17. A non-transitory computer-readable medium having stored thereon executable instructions that, when executed, cause a computer to:
label at least a portion of unlabeled data in at least one natural language document as at least one attribute for a product via at least one classification algorithm operating upon the at least one natural language document;
label at least another portion of the unlabeled data as at least one value for the product via the at least one classification algorithm operating upon at least one natural language document;
for at least two attributes of the at least one attribute, calculate correlation values between each of the at least two attributes;
for at least two values of the at least one value, calculate correlation values between each of the at least two values;
merge attributes of the at least two attributes having correlation values above a correlation threshold;
merge values of the at least two values having correlation values above the correlation threshold; and
store the at least one attribute and the at least one value.

18. The non-transitory, computer-readable medium of claim 17, wherein the executable instructions that, when executed, cause the computer to identify the at least one attribute and the at least one value via the at least one classification algorithm further cause the computer to identify the at least one attribute and the at least one value via a supervised classification algorithm.

19. The non-transitory, computer-readable medium of claim 17, wherein the executable instructions that, when executed, cause the computer to identify the at least one attribute and the at least one value via the at least one classification algorithm further cause the computer to identify the at least one attribute and the at least one value via a semi-supervised classification algorithm.

20. The non-transitory, computer-readable medium of claim 17, wherein the executable instructions that, when executed, cause the computer to identify the at least one attribute and the at least one value via the at least one classification algorithm further cause the computer to identify the at least one attribute and the at least one value via an unsupervised classification algorithm.

21. The non-transitory, computer-readable medium of claim 17, further comprising executable instructions that, when executed, cause the computer to:
obtain the at least one natural language document via a public communication network.

22. The non-transitory, computer-readable medium of claim 17, further comprising executable instructions that, when executed, cause the computer to:
associate one of the at least one attribute with one of the at least one value to provide an attribute-value pair; and
store the attribute-value pair.

23. The non-transitory, computer-readable medium claim 22, wherein the executable instructions that, when executed, cause the computer to associate the attribute with the value further cause the computer to associate the attribute with the value based on selection criteria to provide the attribute-value pair.

24. The non-transitory, computer-readable medium of claim 17, further comprising executable instructions that, when executed, cause the computer to:
generate seed attributes and corresponding seed values, wherein the executable instructions that, when executed, cause the computer to generate the seed attributes and the seed values further cause the computer to identify the seed attributes and the corresponding seed values via an unsupervised classification algorithm as applied to the at least one natural language document; and
wherein the executable instructions that, when executed, cause the computer to label the at least one attribute and the least one value further cause the computer to label the at least one attribute and the at least one value via the classification algorithm operating upon the at least one natural language document based on the seed attributes and the corresponding seed values.

25. A method for identifying at least one attribute and at least one value of a product based on at least one natural language document, the method comprising:
identifying, by a computer, a first set of attributes and a first set of values of the product via a supervised algorithm as applied to the at least one natural language document;
identifying a second set of attributes and a second set of values of the product via a semi-supervised algorithm as applied to the at least one natural language document based at least in part upon the first set of attributes and the first set of values;
providing the first set of attributes and the second set of attributes as the at least one attribute;
providing the first set of values and the second set of values as the at least one value;
for at least two attributes of the at least one attribute, calculating correlation values between each of the at least two attributes;
for at least two values of the at least one value, calculating correlation values between each of the at least two values;
merging attributes of the at least two attributes having correlation values above a correlation threshold;
merging values of the at least two values having correlation values above the correlation threshold; and
storing the at least one attribute and the at least one value.

26. The method of claim 25, further comprising:
providing seed attributes and corresponding seed values identified by an unsupervised classification algorithm as applied to the at least one natural language document, wherein the supervised algorithm identifies the first set of attributes and the first set of values based on the seed attributes and the corresponding seed values.

27. The method of claim 26, further comprising:
obtaining the at least one natural language document via a public communication network.

28. An apparatus for identifying at least one attribute and at least one value of a product based on at least one natural language document, comprising:
a supervised classification algorithm module, implemented by a processor executing instructions stored by a storage device, operative to identify a first set of attributes and a first set of values of the product based on the at least one natural language document;
a semi-supervised classification algorithm module, implemented by the processor executing instructions stored by the storage device, operative to identify a second set of attributes and a second set of values of the product based at least in part upon the at least one natural language document and the first set of attributes and the first set of values, wherein the first set of attributes and the second set of attributes constitute the at least one attribute and the first set of values and the second set of values constitute the at least one value;
a linking module, implemented by the processor executing instructions stored by the storage device, operative to calculate correlation values between each of at least two attributes of the at least one attribute, calculate correlation values between each of at least two values of the at least one value, merge attributes of the at least two attributes having correlation values above a correlation threshold and merge values of the at least two values having correlation values above the correlation threshold; and
a machine readable store operative to store the at least one attribute, and to store the at least one value.

29. The apparatus of claim 28, further comprising:
an unsupervised classification algorithm module operative to identify seed attributes and corresponding seed values based on the at least one natural language document,
wherein the supervised classification algorithm module is further operative to identify the first set of attributes and the first set of values based on the seed attributes and the corresponding seed values.

30. The apparatus of claim 28, further comprising:
a network interface operative to obtain the at least one natural language document via a public communication network.

31. A non-transitory computer-readable medium having stored thereon executable instructions that, when executed, cause the computer to:
identify a first set of attributes and a first set of values of a product via a supervised classification algorithm as applied to at least one natural language document;
identify a second set of attributes and a second set of values of the product via a semi-supervised classification algorithm as applied to the at least one natural language document based at least in part upon the first set of attributes and the first set of values;
provide the first set of attributes and the second set of attributes as at least one attribute;
provide the first set of values and the second set of values as at least one value;
for at least two attributes of the at least one attribute, calculate correlation values between each of the at least two attributes;
for at least two values of the at least one value, calculate correlation values between each of the at least two values;
merge attributes of the at least two attributes having correlation values above a correlation threshold;
merge values of the at least two values having correlation values above the correlation threshold; and
store the at least one attribute and the at least one value.

32. The computer-readable medium of claim 31, further comprising executable instructions that, when executed, cause the computer to:
provide seed attributes and corresponding seed values identified by an unsupervised classification algorithm as applied to the at least one natural language document,
wherein the executable instructions that, when executed, cause the computer to identify the first set of attributes and the first set of values further cause the computer to identify the first set of attributes and the first set of values via the supervised classification algorithm based on the seed attributes and the corresponding seed values.

33. The computer-readable medium of claim 31, further comprising executable instructions that, when executed, cause the computer to:
obtain the at least one natural language document via a public communication network.

34. A method for extracting at least one attribute and at least one value for a product based on at least one natural language document comprising unlabeled data, the method comprising:
labeling, by a computer, the unlabeled data as seed attributes and corresponding seed values via an unsupervised classification algorithm as applied to the at least one natural language document;
labeling the unlabeled data as the at least one attribute for the product via at least one of a supervised classification algorithm and a semi-supervised classification algorithm operating upon the at least one natural language document and based on the seed attributes and the corresponding seed values;
labeling the unlabeled data as the at least one value for the product via at least one of the supervised classification algorithm and the semi-supervised classification algorithm operating upon the at least one natural language document and based on the seed attributes and the corresponding seed values;
for at least two attributes of the at least one attribute, calculating correlation values between each of the at least two attributes;
for at least two values of the at least one value, calculating correlation values between each of the at least two values;
merging attributes of the at least two attributes having correlation values above a correlation threshold;
merging values of the at least two values having correlation values above the correlation threshold; and
storing the at least one attribute and the at least one value.

* * * * *